(12) United States Patent
Asprion et al.

(10) Patent No.: US 7,004,997 B2
(45) Date of Patent: Feb. 28, 2006

(54) METHOD FOR REMOVAL OF ACID GASES FROM A GAS FLOW

(75) Inventors: Norbert Asprion, Mannheim (DE); Christoph Grossmann, Limburgerhof (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 2 days.

(21) Appl. No.: 10/484,161

(22) PCT Filed: Jul. 19, 2002

(86) PCT No.: PCT/EP02/08092

§ 371 (c)(1),
(2), (4) Date: Jan. 20, 2004

(87) PCT Pub. No.: WO03/009924

PCT Pub. Date: Feb. 6, 2003

(65) Prior Publication Data

US 2004/0154469 A1    Aug. 12, 2004

(30) Foreign Application Priority Data

Jul. 20, 2001   (DE) .............................. 101 35 370

(51) Int. Cl.
*B01D 53/14*  (2006.01)
(52) U.S. Cl. ........................... 95/235; 95/236; 423/229
(58) Field of Classification Search ................ 95/187, 95/191, 192, 203, 235, 236; 423/220, 229
See application file for complete search history.

(56) References Cited

U.S. PATENT DOCUMENTS

| | | | |
|---|---|---|---|
| 4,336,233 A * | 6/1982 | Appl et al. | 423/228 |
| 4,537,753 A | 8/1985 | Wagner et al. | |
| 4,551,158 A | 11/1985 | Wagner et al. | |
| 4,553,984 A | 11/1985 | Volkamer et al. | |
| 5,700,437 A | 12/1997 | Mitsuoka et al. | |
| 5,736,115 A * | 4/1998 | Iijima et al. | 423/228 |
| 6,423,282 B1 * | 7/2002 | Araki et al. | 423/210 |
| 6,436,174 B1 * | 8/2002 | Grossmann et al. | 95/191 |
| 6,740,230 B1 * | 5/2004 | Hugo et al. | 208/237 |

FOREIGN PATENT DOCUMENTS

| | | |
|---|---|---|
| DE | 25 51 717 | 6/1977 |
| DE | 198 28 977 | 12/1999 |
| EP | 008 449 | 3/1980 |
| EP | 159 495 | 10/1985 |
| EP | 190 434 | 8/1986 |
| EP | 202 600 | 11/1986 |
| EP | 359 991 | 3/1990 |
| EP | 558 019 | 9/1993 |
| EP | 879 631 | 11/1998 |
| WO | 00/66249 | 11/2000 |

* cited by examiner

*Primary Examiner*—Frank M. Lawrence
(74) *Attorney, Agent, or Firm*—Oblon, Spivak, McClelland, Maier & Neustadt, P.C.

(57) ABSTRACT

A process is described for removing acid gases from a gas stream in which an acid-gas-containing gas stream in which the sum of the partial pressures of the acid gases does not exceed 1,500 mbar is brought into contact with an aqueous absorbent in an absorption step and an absorbent is used which contains methyldiethanolamine and piperazine at a concentration of at least 8% by weight of the absorbent, an acid-gas-depleted gas stream and an acid-gas-loaded absorbent being obtained.

11 Claims, 3 Drawing Sheets

METHOD FOR REMOVAL OF ACID GASES FROM A GAS FLOW

The present invention relates to a process for removing acid gases from a gas stream in which an acid-gas-containing gas stream is brought into contact with an absorbent in an absorption step, as a result of which an acid-gas-depleted gas stream and an acid-gas-charged absorbent are obtained.

BACKGROUND OF THE INVENTION

In numerous processes in the chemical industry, gas streams occur which contain acid gases, for example $CO_2$, $H_2S$, $SO_2$, $CS_2$, HCN, COS or mercaptans as impurities. These gas streams can be, for example, natural gas, synthesis gas from heavy oil or heavy residues, refinery gas or reaction gas formed in the partial oxidation of organic materials, for example coal or petroleum. Before these gases can be transported or further processed, the acid gas content of the gas must be markedly reduced. $CO_2$ must be removed from natural gas, for example, since a high concentration of $CO_2$ decreases the heating value of the gas. Furthermore, $CO_2$, together with water frequently entrained in the gas streams can lead to corrosion on pipes and fittings.

The removal of sulfur compounds from these gas streams is of particular importance for various reasons. For example, the sulfur compound content of natural gas must be reduced by suitable processing measures directly at the natural gas source, since the sulfur compounds, in the water frequently entrained in the natural gas, also form acids which have a corrosive effect. To transport the natural gas in a pipeline, therefore, preset limiting values of sulfur contaminants must be maintained. Furthermore, numerous sulfur compounds are foul-smelling even at low concentrations, and, especially hydrogen sulfide, are toxic.

It is known to remove the unwanted acid gas constituents from the gases by gas scrubbing with aqueous or nonaqueous mixtures of organic solvents as adsorbents. In this process both physical and chemical solvents are used. Known physical solvents are, for example, cyclotetramethylenesulfone (sulfolane), N-methylpyrrolidone and N-alkylated piperidones. The chemical solvents which have proven themselves industrially are, in particular, the aqueous solutions of primary, secondary and tertiary aliphatic amines and alkanolamines such as monoethanolamine (MEA), diethanolamine (DEA), monomethylethanolamine (MMEA), diethylethanolamine (DEEA), triethanolamine (TEA), diisopropanolamine (DIPA) and methyldiethanolamine (MDEA).

Tertiary alkanolamines do not react directly with $CO_2$, since the amine is completely substituted. Rather, $CO_2$ is reacted in a slow reaction with the tertiary alkanolamine and with water to form bicarbonate. Because of the slow reaction of the $CO_2$, in the gas scrubbing, the scrubbing process must be carried out using tertiary alkanolamine solutions having a high liquid/gas ratio with a correspondingly high solvent recirculation. Therefore, attempts have been made to increase the absorption rate of carbon dioxide in aqueous solutions of tertiary alkanolamines by adding further compounds which are termed activators or promoters.

Promoters of this type can be primary and secondary amines. A preferred promoter is piperazine. The nitrogen of the primary and secondary amines reacts directly with carbon dioxide, forming carbamate. In the aqueous amine solution, the carbamate is in equilibrium with bicarbonate. To regenerate the amine solution, in which carbon dioxide and if appropriate other absorbed acid gases are removed by expansion and steam stripping, a large amount of steam and correspondingly a large amount of thermal energy are required to decompose the carbamate. Furthermore, the solubility of piperazine in aqueous solution is low.

Therefore primary and secondary amines, such as piperazine, have previously always been used in very small amounts, that is to say generally less than one mol/l of absorbent. For example, there are numerous absorbents which contain methyldiethanolamine and piperazine in combination in aqueous solution, the piperazine concentration being less than 1 mol/l of absorption solution (U.S. Pat. No. 4,336,233; DE 25 51 717; U.S. Pat. No. 4,551,158; U.S. Pat. No. 4,553,984; U.S. Pat. No. 4,537,753; U.S. Pat. No. 4,999,031; CA 1,291,321; EP 202 600; EP-A 159 495; EP-A-190 434).

Absorbents having higher contents of secondary amine, such as piperazine, are disclosed in the following publications:

EP-A-0 008 449 describes the purification of COS-containing gases or liquids by hydrolyzing the COS using aqueous solutions containing N-heterocyclic compounds. The N-heterocycle present can be up to 75% by weight piperazine, and in addition up to 50% by weight of methyldiethanolamine (MDEA).

WO 00/00271 discloses an absorbent which contains from 0.1 to 50% by weight of nitrogen heterocycles, for example piperazine, from 1 to 60% by weight of an alcohol, from 0 to 60% by weight of an aliphatic alkanolamine, for example methyldiethanolamine, from 0 to 98.9% by weight of water and from 0 to 35% by weight of $K_2CO_3$. The absorbent has a high absorption rate and high capacity for acid gas constituents. The absorbent is particularly suitable for gases to be purified which contain $CO_2$ in amounts up to 75% by volume and $H_2S$ in amounts up to 50% by volume. Furthermore, the gases to be purified can contain COS, preferably in amounts up to 5% by volume, $CS_2$, preferably in amounts up to 1% by volume, and mercaptans, preferably alkylmercaptans, in amounts up to 1% by volume.

EP-A-0 879 631 discloses a process for removing $CO_2$ from gases, inter alia using aqueous solutions of a secondary amine, for example piperazine, and of a tertiary amine, for example methyldiethanolamine. Both amines can be used at concentrations in each case of from 10 to 45% by weight, in which case the total concentration is not to exceed 70% by weight. The gases purified in the examples contain 10 mol % $CO_2$.

EP-A-0 359 991 discloses a process for removing $CO_2$ and if appropriate $H_2S$ from gases, using aqueous absorption solutions containing tertiary alkanolamines, in particular methyldiethanolamine. Preferably, in addition, a secondary amine such as piperazine may be present. The tertiary amine is preferably present in the absorption solution in an amount of from 20 to 70% by weight, and the secondary amine in an amount from 0.05 to 3 mol/l (from 0.4 to 24.6% by weight). The gases to be purified are to have a $CO_2$ content of from 1 to 90 mol %, particularly preferably from 3 to 60 mol % by weight. In addition to $CO_2$, the gases to be purified can contain, as further acid gases, $H_2S$, for example in amounts of from 1 mol ppm to 50 mol %.

WO 00/66249 discloses an absorbent and a process for removing acid gases from gas streams which can contain, for example, $CO_2$, $H_2S$, COS, $SO_2$, $SO_3$, $CS_2$, HCN, $O_2$ and mercaptans. The absorbent is considered suitable for gases which are contaminated by from about 10 to 10,000 ppmv of mercaptans, up to 90 mol % $H_2S$, up to 50 mol % $CO_2$, from about 2 to 10,000 ppmv COS. The absorbent contains more than 1 mol % piperazine, preferably more than 1.1 mol %, particularly preferably more than 1.2 mol % piperazine per liter of aqueous absorbent, and from 1.5 to 6 mol % of methyldiethanolamine (MDEA) per liter of aqueous absorbent. Toward MDEA- and piperazine-containing absorbants which contain less than 1 mol/l of piperazine, the absorbent is said to ensure, at a decreased absorbent recirculation rate and higher absorber temperature, appropriate $CO_2$ removal from the contaminated gas and improved behavior during the downstream regeneration.

The known absorbents which can contain piperazine at a concentration of at least 1 mol/l of absorbent are intended for treating gases which have high concentrations of impurities due to acid gases. For example, the acid gases in natural gas purification are generally present at a partial pressure in the range from 3 to 7 bar (at a total pressure of from about 50 to 70 bar). However, frequently, gases must also be purified which have only low levels of acid gas impurities, that is to say the partial pressure of the acid gases in the gas or gas mixture to be treated is low. In the case of acid gases present at only low concentrations, during the extraction under customary conditions, only a low equilibrium loading of the absorbent is achieved. To remove the acid gases, therefore, the use of relatively large amounts of absorbents is necessary.

BRIEF SUMMARY OF THE INVENTION

It is an object of the present invention, therefore, to provide a process for removing acid gases from a gas or gas mixture which has acid gases as impurities at low partial pressures, in which process a high equilibrium loading is achieved and which can therefore be carried out using relatively small amounts of absorbent. "Low partial pressures" means that the partial pressure of all acid gases to be removed does not exceed 1,500 mbar in total.

We have found that this object is achieved by aqueous absorbents which contain a tertiary alkanolamine and at least 8% by weight of piperazine, in particular those which consist of water, methyldiethanolamine (MDEA) and more than 8% by weight of piperazine which are particularly suitable for removing low levels of acid gas impurities.

The present invention therefore relates to a process for removing acid gases from a gas stream in which an acid-gas-containing gas stream in which the sum of the partial pressures of the acid gases does not exceed 1,500 mbar is brought into contact with an aqueous absorbent in an absorption step and an absorbent is used which contains at least one tertiary alkanolamine and piperazine at a concentration of at least 8% by weight of the absorbent, an acid-gas-depleted gas stream and an acid-gas-loaded absorbent being obtained.

The comparatively high piperazine concentration of the absorbent increases the equilibrium loading of the absorbant with acid gases, in particular $CO_2$ and $H_2S$. As a result the solvent recirculation rate can be decreased, which permits the use of shorter absorption columns. This effect is surprisingly considerably more evident at low partial pressures of the acid gas impurities, in particular $CO_2$ and $H_2S$, than at higher partial pressures of the acid gas impurities.

A further improvement in mass transfer rate and loading capacity is displayed by absorbents which consists solely of water, MDEA and piperazine. The effect can be further increased by a high total amine content.

The tertiary alkanolamine can be an alkyldialkanolamine, dialkylmonoalkanolamine or trialkanolamine, with each alkyl group having 1, 2, 3 or 4 carbons and each alkanol group having 2, 3 or 4 carbons. Examples of alkanolamines are methyldiethanolamine, ethyldiethanolamine, dimethylethanolamine, triethanolamine etc. Preference is given to methyldiethanolamine.

The inventive process and absorbent are suitable for removing acid gases from gas streams. The acid gases are, in particular, $CO_2$, $H_2S$, COS and mercaptans. In addition, $SO_3$, $CS_2$ and HCN may also be present. Gases which contain the acid gases and are essentially not absorbed by the absorbent are, in particular, natural gas, synthesis gas, coke oven gas, flue gas, combustion exhaust gas, landfill gases, coal gasification gas and recycled gas. In addition to one or more of said acid gases, the gases can contain other inert gas constituents which are not absorbed to a significant extent by the absorbent. Examples are volatile hydrocarbons, preferably $C_1$–$C_4$ hydrocarbons, such as methane, and also nitrogen and hydrogen.

The inventive process is particularly advantageously applicable to purifying gases having a total acid gas partial pressure of up to 1,000 mbar, in particular up to 500 mbar. Here, the advantages of the high piperazine concentration are particularly marked. Expedient purification is possible down to a lower limit of the sum of partial pressures of the acid gas impurities of about 1 mbar.

In the aqueous absorbent used in the inventive process, the total amine concentration is at least 20% by weight, preferably at least 25% by weight, particularly preferably at least 30% by weight of the absorbent. Particularly preferably, the concentration of total amine is in the range from 20 to 70% by weight, in particular from 20 to 60% by weight, and particularly preferably from 20 to 55% by weight of the absorbent. The piperazine concentration is preferably from 8 to 40% by weight, particularly preferably from 10 to 30% by weight, and in particular from 15 to 25% by weight, of the absorbent.

The principle of the process sequence for gas scrubbing, and also possible variants, as can be carried out according to the invention, are described below.

The starting gas stream containing the acid gas constituents is brought into contact, in an absorber, with the absorbent, in an absorption step, as a result of which the acid gas constituents are at least partially scrubbed out. Preferably, a scrubbing apparatus used in customary gas scrubbing processes functions as absorber. Suitable scrubbing apparatuses are, for example, columns packed with random packings, columns packed with ordered packings, radial flow scrubbers, jet scrubbers, venturi scrubbers and rotary spray scrubbers, preferably columns packed with random packings, columns packed with ordered packings and tray columns. The gas stream is preferably treated in counterflow in a column. The gas stream in this case is generally fed into the lower region of the column and the absorbent into the upper region of the column.

The temperature of the absorbent is, in the absorption step, generally from 40 to 100° C., when a column is used, for example, from 40 to 70° C. at the top of the column and from 50 to 100° C. at the bottom of the column. The total pressure in the absorption step is generally from 1 to 120 bar. A product gas (clean gas) depleted in acid gas constituents, and an absorbent loaded with acid gas constituents are obtained.

The process can comprise one or more sequential absorption steps. Preferably, the absorption step is carried out in a substep, in which case the starting gas (dirty gas) containing the acid gas constituents is brought into contact with the absorbent.

The acid gas constituents can be released from the absorbent loaded with the acid gas constituents in a regeneration step, a regenerated absorbent being obtained. In the regeneration step, the loading of the absorbent is quite generally decreased. The resultant regenerated absorbent is preferably then recycled to the absorption step.

Generally, the regeneration step comprises a pressure reduction of the loaded absorbent from a high pressure, as prevails when the absorption step is being carried out, to a lower pressure, which is typically approximately 1.5 bar above the partial pressure of the acid gas constituents in the absorption step. The pressure can be reduced, for example, using a throttle valve and/or an expansion turbine.

In the regeneration step, stripping is carried out, the acid gas constituents being released from the absorbent. The stripping can be performed in one or more stages. The stripping can be carried out in a desorption column equipped with random packings or ordered packings in which the stripping medium flows in countercurrent to the absorbent. Preferably, the pressure during stripping is from 1 to 3 bar absolute and the temperature from 90 to 130° C., stripping being performed using hot gas or steam, preferably steam. Stripping processes are described, for example, in EP-A-0 159 495, EP-A-0 190 434, EP-A-0 359 991. To compensate for water losses due to water present in the gas streams taken off, steam can be supplied, for example at the bottom of an expansion stage, as described in EP-A-0 159 495 and U.S. Pat. No. 4,551,158 (EP-A-0 121 109).

The invention will now be described in more detail by examples.

DETAILED DESCRIPTION OF THE INVENTION

Figure 1:
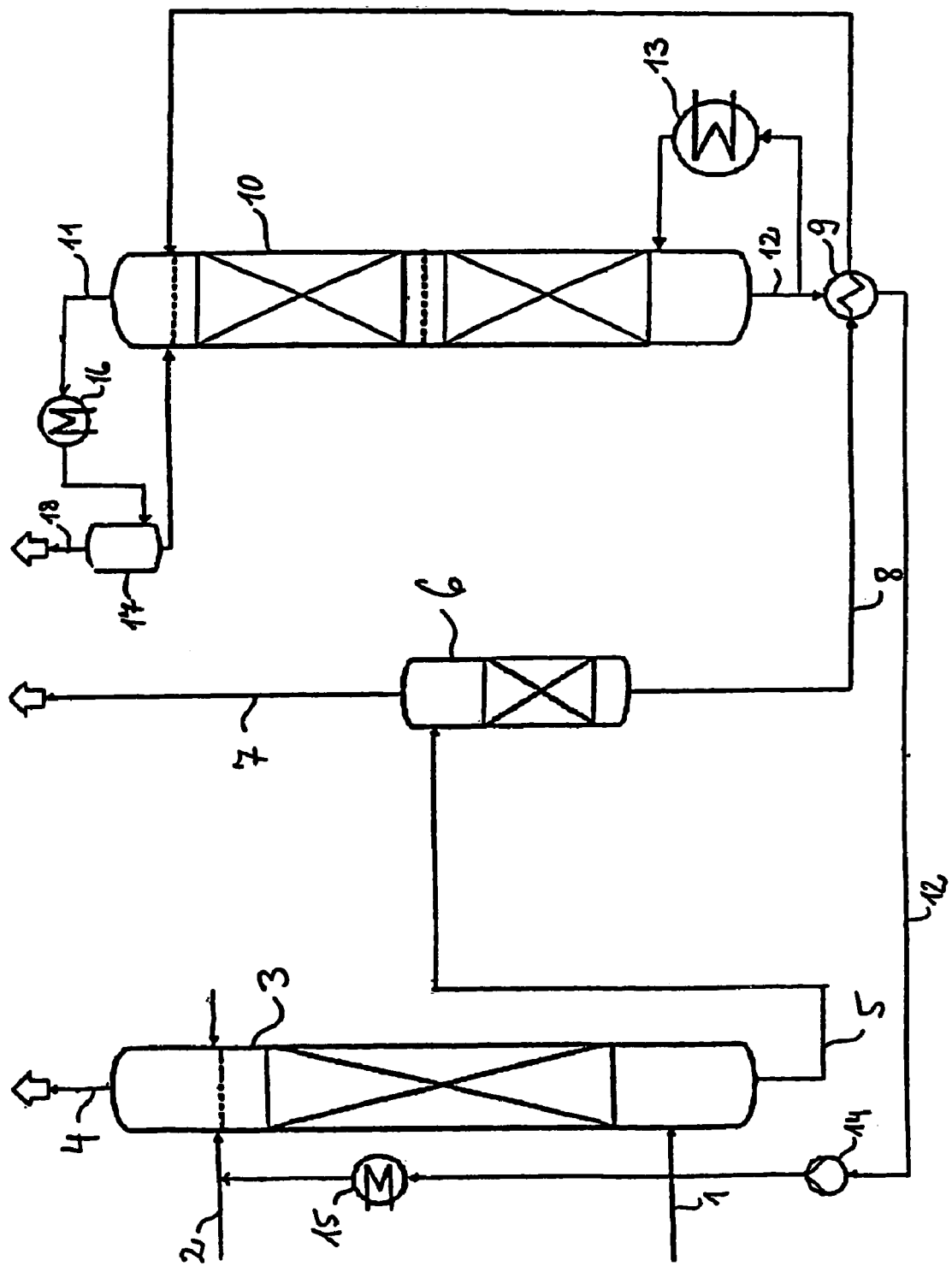
FIG. 1 shows a diagrammatic representation of the process sequence of one embodiment of the invention process.

FIG. 1 is a diagrammatic representation of the process sequence of one embodiment of the inventive process. A dirty gas rich in acid gas constituents is passed via a feed line 1 into the lower region of an absorber 3 constructed as a column, which absorber has a conventional random packing. In the absorber 3 the dirty gas is brought into contact in counterflow with the absorbent which is fed into the upper region of the absorber via line 2. In this process the feed stream is separated into an acid-gas-depleted gas stream (clean gas) and an acid-gas-enriched absorbent stream. The clean gas is discharged at the top of the absorber 3 via the line 4 and the loaded absorbent leaves the absorber in the lower region via line 5.

The loaded absorbent is introduced into the upper region of the expansion column 6 which is generally operated at a pressure which is above the partial pressure of $CO_2$ in the dirty gas fed to the absorber. The absorbent is generally expanded using customary apparatuses, for example a level control valve, a hydraulic turbine or a pump running backwards. In the expansion, the majority of the dissolved non-acid gases and a small part of the acid gases are released. These gases are ejected overhead from the expansion column 6 via the line 7.

The absorbent which is still loaded with the majority of the acid gases leaves the expansion column via line 8 and is heated in the heat exchanger 9. The heated absorbent is fed into the upper region of the stripper 10 which is equipped with two ordered packings. The absorbent is further expanded in the valve 9 and in the stripper 10. The main quantity of the acid gases is stripped with steam and leaves the stripper 10 at the top via line 11. The regenerated absorbent leaves the stripper 10 in the bottom via line 12, a substream being recirculated via the reboiler 13, in order to generate the steam required for the stripping. The absorbent leaving the stripper 10 is passed via the heat exchanger 9, with the acid-gas-enriched absorbent coming from the expansion column 6 being heated. The regenerated absorbent can be reused in the absorber 3 via the line 12, feed pump 14 and after heating using the heat exchanger 15. The acid gases are discharged together with steam at the top of the stripper 10 via line 11 and passed via the condenser 16 to condense the steam. The condensate is fed together with the acid gases into the separation vessel 17, the acid gases being discharged via the line 18 and enough condensate being recirculated to the top of the stripper 10 to compensate for the water losses.

EXAMPLE 1

Figure 2:
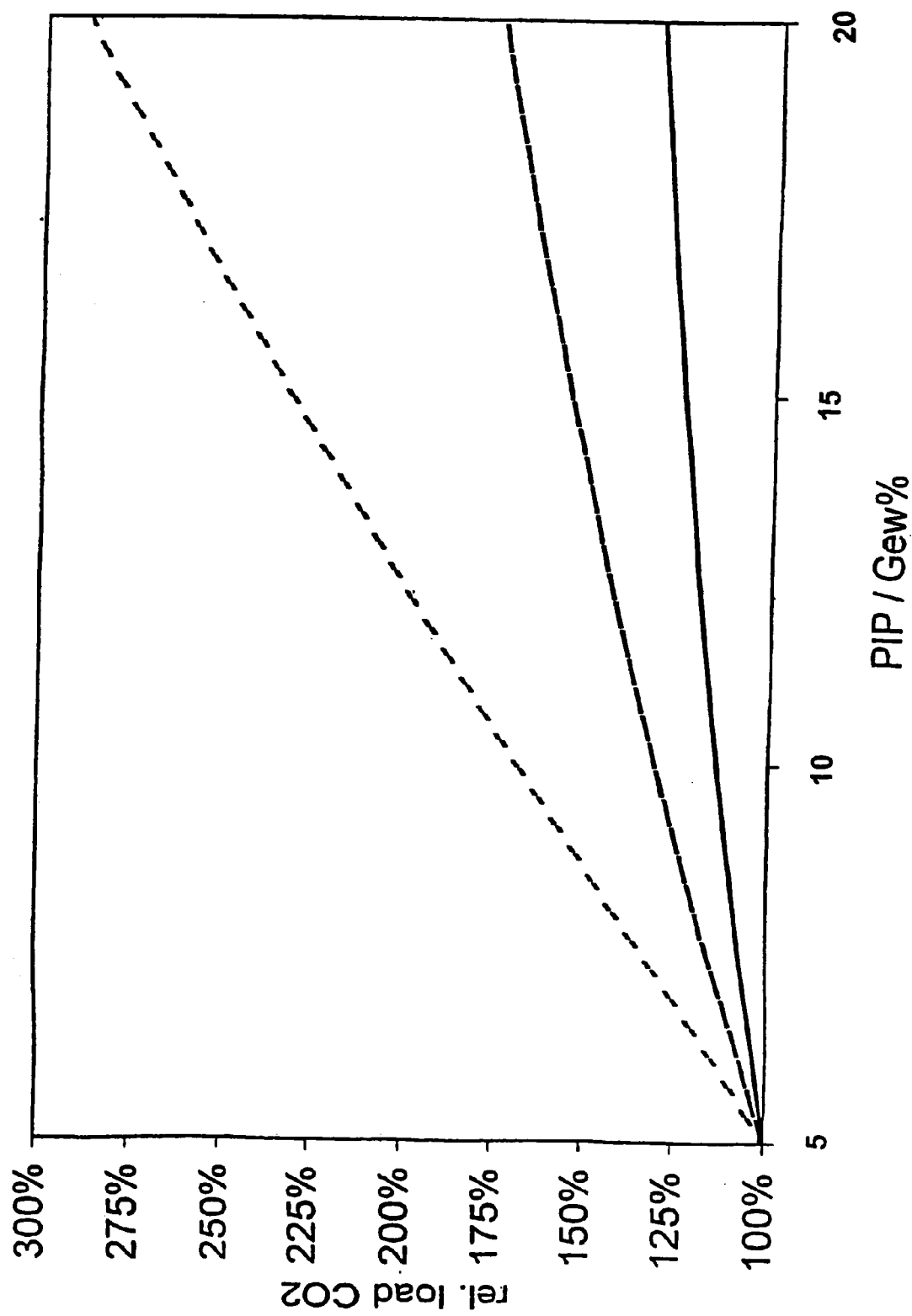
FIG. 2 shows the relative equilibrium loading of $CO_2$, which was obtained according to the invention relative to a comparative example.

Calculations were carried out using a phase equilibrium model (Pitzer model; Kenneth S. Pitzer, Activity Coefficients in Electrolyte Solutions 2nd Ed., CRC-Press, 1991, Chapt. 3, Ion Interaction Approach: Theory and Data Correlation; the parameters of the model were adapted to phase equilibrium measurements in the system $CO_2/H_2O/MDEA/$ piperazine/$H_2O$) for three different $CO_2$ partial pressures (70 mbar; 700 mbar; 3 bar). An aqueous absorbent was used as a basis which contains 60% by weight of water and a mixture of MDEA and piperazine. The piperazine concentration used as a base was 5, 10, 15 and 20% by weight (remainder: MDEA). The results are shown in FIG. 2 (70 mbar: dotted line, 700 mbar: dashed line, 3 bar: continuous line). The equilibrium loading was shown relative to the comparative absorbent which contains 5% by weight of piperazine, 35% by weight of MDEA and 60% by weight of water.

It can be seen that using the inventive process a higher loading capacity with $CO_2$ is achieved than using the comparative absorbent. Furthermore, FIG. 2 shows that the relative loading capacity surprisingly continues to increase with decreasing partial pressure. At the lowest partial pressure and the highest piperazine concentration the relative loading is roughly three times that of the comparative example and more than twice the loading achieved when the partial pressure of the acid gases is 3 bar.

EXAMPLE 2

Figure 3:
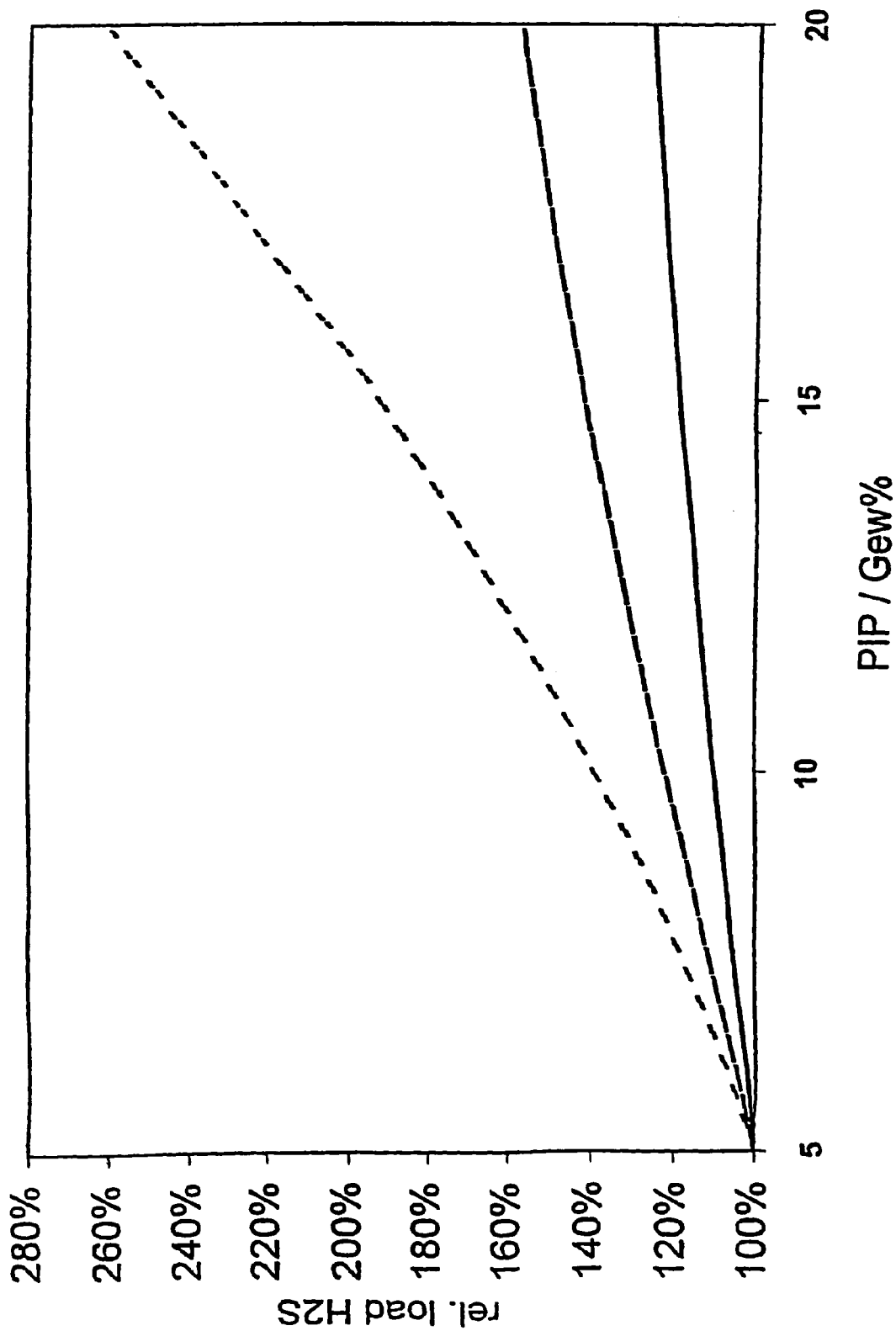
FIG. 3 shows the relative equilibrium loading of $H_2S$ which was obtained according to the invention relative to a comparative example.

The equilibrium loading of $H_2S$ was determined in a similar manner to example 1. The results are shown in FIG. 3 (70 mbar: dotted line, 700 mbar: dashed line, 3 bar: continuous line).

It can be seen that in the inventive process a higher relative loading capacity with $H_2S$ is achieved over the entire range. At the highest reported piperazine concentration and the lowest $H_2S$ partial pressure, this reaches about 2.6 times the value of the comparative absorbent. Furthermore, it can be seen that here also the relative equilibrium loading at the highest piperazine concentration and the lowest partial pressure is more than twice that at an $H_2S$ partial pressure of 3 bar.

We claim:

1. A process for removing acid gases from a gas stream comprising
   contacting an acid-gas-containing gas stream in which the sum of the partial pressures of the acid gases does not exceed 1,500 mbar with an aqueous absorbent at a total pressure of from 50 to 70 bar wherein the absorbent consists of water, at least one tertiary alkanolamine and piperazine at a concentration of 15 to 40% by weight of the absorbent to form an acid-gas-depleted gas stream and an acid-gas-loaded absorbent.

2. The process as claimed in claim 1, wherein the sum of the partial pressures of the acid gases in the gas stream is <1,000 mbar.

3. The process as claimed in claim 1, wherein the total amine concentration in the absorbent is in the range from 20 to 70% by weight of the absorbent.

4. The process as claimed in claim 3, wherein the total amine concentration in the absorbent is in the range from 20 to 55% by weight of the absorbent.

5. The process as claimed in claim 1, wherein the piperazine concentration in the absorbent is in the range from 15 to 25% by weight of the absorbent.

6. The process as claimed in claim 1, wherein the tertiary alkanolamine is methyldiethanolamine.

7. The process as claimed in claim 1, further comprising releasing the acid gases from the loaded absorbent to form a regenerated absorbent.

8. The process as claimed in claim 7, wherein the releasing comprises one or more expansion stages.

9. The process as claimed in claim 7, wherein the releasing comprises one or more stripping stages.

10. The process as claimed in claim 1, wherein the sum of the partial pressures of the acid gases in the gas stream is $\leq 500$ mbar.

11. The process as claimed in claim 7, further comprising recirculating the regenerated absorbent and contacting the regenerated absorbent with the acid-gas-containing gas stream.

* * * * *